US012763315B2

(12) United States Patent
Sommer et al.

(10) Patent No.: US 12,763,315 B2
(45) Date of Patent: Oct. 13, 2026

(54) PROCESS FOR MAKING AN ELECTRODE ACTIVE MATERIAL, AND ELECTRODE ACTIVE MATERIAL

(71) Applicant: BASF SE, Ludwigshafen am Rhein (DE)

(72) Inventors: Heino Sommer, Ludwigshafen (DE); Christoph Erk, Ludwigshafen (DE); Jacob Haag, Beachwood, OH (US); James A Sioss, Beachwood, OH (US); Daniela Pfister, Ludwigshafen (DE); Kathrin Michel, Ludwigshafen (DE); Lennart Karl Bernhard Garve, Ludwigshafen (DE); Benjamin Johannes Herbert Bergner, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 561 days.

(21) Appl. No.: 18/252,633

(22) PCT Filed: Dec. 10, 2021

(86) PCT No.: PCT/EP2021/085261

§ 371 (c)(1),
(2) Date: May 11, 2023

(87) PCT Pub. No.: WO2022/128805

PCT Pub. Date: Jun. 23, 2022

(65) Prior Publication Data

US 2024/0006580 A1 Jan. 4, 2024

(30) Foreign Application Priority Data

Dec. 18, 2020 (EP) .................................... 20215556

(51) Int. Cl.

| | |
|---|---|
| ***H01M 4/04*** | (2006.01) |
| ***H01M 4/505*** | (2010.01) |
| ***H01M 4/525*** | (2010.01) |
| ***H01M 4/62*** | (2006.01) |
| *H01M 4/02* | (2006.01) |

(52) U.S. Cl.

CPC ......... *H01M 4/0471* (2013.01); *H01M 4/505* (2013.01); *H01M 4/525* (2013.01); *H01M 4/621* (2013.01); *H01M 4/625* (2013.01); *H01M 2004/028* (2013.01)

(58) Field of Classification Search

CPC ........ C01G 53/00; C01G 53/04; C01G 53/42; C01G 53/50; C01G 53/82; C01P 2002/52; C01P 2002/54; C01P 2004/32; C01P 2004/50; C01P 2004/51; C01P 2004/61; C01P 2006/12; C01P 2006/40; C01P 2006/82; H01M 2004/028; H01M 4/0471; H01M 4/505; H01M 4/525; H01M 4/621; H01M 4/625; Y02E 60/10

See application file for complete search history.

(56) References Cited

U.S. PATENT DOCUMENTS

| | | | |
|---|---|---|---|
| 2008/0131780 | A1 | 6/2008 | Kawasato et al. |
| 2021/0013510 | A1 | 1/2021 | Inoue |
| 2022/0006081 | A1 | 1/2022 | Choi et al. |

FOREIGN PATENT DOCUMENTS

| | | | | |
|---|---|---|---|---|
| EP | 1189296 | A2 | 3/2002 | |
| EP | 3632851 | A1 | 4/2020 | |
| EP | 3659975 | A1 | 6/2020 | |
| JP | 2018107131 | A | 7/2018 | |
| KR | 20170075596 | A | 7/2017 | |
| WO | 2019011786 | A1 | 1/2019 | |
| WO | WO-2020067795 | A1 * | 4/2020 | ............. C01G 53/82 |
| WO | 2020094716 | A1 | 5/2020 | |
| WO | 2020148104 | A1 | 7/2020 | |
| WO | 2022069237 | A1 | 4/2022 | |
| WO | 2022078701 | A1 | 4/2022 | |
| WO | 2022101103 | A1 | 5/2022 | |

OTHER PUBLICATIONS

International Search Report and Written Opinion for corresponding PCT/EP2021/085261 mailed Jul. 6, 2022; 14 pages.

European Search Report for EP Patent Application No. 20215556.0, Issued on Dec. 16, 2021, 3 pages.

* cited by examiner

*Primary Examiner* — Victoria H Lynch
(74) *Attorney, Agent, or Firm* — Armstrong Teasdale LLP

(57) ABSTRACT

Disclosed herein is a process for making an electrode active material, where said process includes the following steps:

(a) Providing a hydroxide $TM(OH)_2$ or an oxyhydroxide of TM, where TM is one or more metals and contains Mn, optionally, Co, and from 85 to 95 mol % Ni, referring to the sum of Ni, Co and Mn;
(b) Drying said hydroxide $TM(OH)_2$ or oxyhydroxide of TM at a temperature in the range of from 400 to 600° C., thereby obtaining an oxide or oxyhydroxide of TM with a residual moisture content of from 200 to 500 ppm;
(c) Mixing said oxide or oxyhydroxide from step (b) with a source of lithium, at least one compound of Mg or Al, and at least one compound of Ti or Zr; and
(d) Treating the mixture obtained from step (c) thermally at a temperature in the range of 550 to 875° C.

5 Claims, No Drawings

PROCESS FOR MAKING AN ELECTRODE ACTIVE MATERIAL, AND ELECTRODE ACTIVE MATERIAL

CROSS-REFERENCE TO RELATED APPLICATIONS

This application is a U.S. National Phase Application of International Patent Application No. PCT/EP2021/085261, filed Dec. 10, 2021, which claims priority to European Patent Application No. 20215556.0, filed Dec. 18, 2020, each of which is hereby incorporated by reference herein.

The present invention is directed towards a process for making an electrode active material wherein said process comprises the following steps:

(a) Providing a hydroxide $TM(OH)_2$ or an oxyhydroxide of TM wherein TM is one or more metals and contains Mn and, optionally, Co, and from 85 to 95 mol % Ni, referring to the sum of Ni, Co and Mn,
(b) Drying said hydroxide $TM(OH)_2$ or oxyhydroxide of TM at a temperature in the range of from 400 to 600° C., thereby obtaining an oxide or oxyhydroxide of TM with a residual moisture content of from 200 to 500 ppm,
(c) mixing said oxide or oxyhydroxide from step (b) with a source of lithium and with at least one compound of Mg or Al and with at least one compound of Ti or Zr,
(d) treating the mixture obtained from step (c) thermally at a temperature in the range of from 550 to 875° C.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

The electrode material is of crucial importance for the properties of a lithium ion battery. Lithium-containing mixed transition metal oxides have gained particular significance, for example spinels and mixed oxides of layered structure, especially lithium-containing mixed oxides of nickel, manganese and cobalt; see, for example, EP 1 189 296. However, not only the stoichiometry of the electrode material is important, but also other properties such as morphology and surface properties.

Generally, lithium-containing mixed transition metal oxides are prepared using a two-stage process. In a first stage, a sparingly soluble salt of the transition metal(s) is prepared by precipitating it from a solution, for example a carbonate or a hydroxide. This sparingly soluble salt is in many cases also referred to as a precursor. In a second stage, the precipitated salt of the transition metal(s) is mixed with a lithium compound, for example $Li_2CO_3$, LiOH or $Li_2O$, and calcined at high temperatures, for example at 600 to 1100° C.

Existing lithium ion batteries still have potential for improvement, especially with regard to the energy density. For this purpose, the cathode material should have a high specific capacity. It is also advantageous when the cathode material can be processed in a simple manner to give electrode layers of thickness from 20 μm to 200 μm, which should have a high density in order to achieve a maximum energy density (per unit volume), and a high cycling stability.

It was therefore an objective to provide electrode active materials with excellent properties such as energy density and capacity retention, and it was an objective to provide a process for making such electrode active materials.

Accordingly, the process defined at the outset has been found, hereinafter also referred to as "inventive process". The inventive process comprises the following steps:

(a) Providing a hydroxide $TM(OH)_2$ or an oxyhydroxide of TM wherein TM is one or more metals and contains Mn and, optionally, Co, and from 85 to 95 mol % Ni, referring to the sum of Ni, Co and Mn,
(b) Drying said hydroxide $TM(OH)_2$ or oxyhydroxide of TM at a temperature in the range of from 400 to 600° C., thereby obtaining an oxide or oxyhydroxide of TM with a residual moisture content of from 200 to 500 ppm,
(c) mixing said oxide or oxyhydroxide from step (b) with a source of lithium and with at least one compound of Mg or Al and with at least one compound of Ti or Zr,
(d) treating the mixture obtained from step (c) thermally at a temperature in the range of from 550 to 875° C.

The inventive process comprises at least four steps, (a), (b), (c), (d), in the context of the present invention also referred to as step (a) and step (b) and step (c) and step (d), respectively. Optionally, the inventive process additionally comprises a step (e) or (f) described further below, or both. Steps (a) to (d) as well as the optional steps (e) and (f) shall be described in more detail below.

The inventive process starts off from a hydroxide $TM(OH)_2$ or at least one oxyhydroxide of TM or a combination of at least two of the foregoing provided in step (a). In such hydroxide $TM(OH)_2$ or at least one oxide TMO or oxyhydroxide of TM, TM is one or more metals and contains Mn and, optionally, Co, and from 85 to 95 mol % Ni, referring to the sum of Ni, Co and Mn. Preferably, TM contains both Co and Mn.

TM may include of at least one metal selected from Al, Ti, Zr, V, Zn, Ba, and Mg. Preferably, TM contains in total up to 0.5 mol-% of at least one metal selected from Ti, Zr, and Co, and only traces of V, Zn, Ba, and Mg. Even more preferably, TM is Ni. The amount and kind of metals such as Ti, Zr, V, Co, Zn, Ba, and Mg may be determined by inductively coupled plasma ("ICP") and by synchrotron XRD.

$TM(OH)_2$ or oxyhydroxide of TM provided in step (a) is preferably comprised of spherical particles, referring to particles that have a spherical shape. Spherical particles shall include not just those which are exactly spherical but also those particles in which the maximum and minimum diameter of at least 90% (number average) of a representative sample differ by not more than 10%.

In one embodiment of the present invention, $TM(OH)_2$ or oxyhydroxide of TM provided in step (a) is comprised of secondary particles that are agglomerates of primary particles. Preferably, $TM(OH)_2$ or oxyhydroxide of TM provided in step (a) is comprised of spherical secondary particles that are agglomerates of primary particles. Even more preferably, $TM(OH)_2$ or oxyhydroxide of TM provided in step (a) is comprised of spherical secondary particles that are agglomerates of spherical primary particles or platelets.

In one embodiment of the present invention, $TM(OH)_2$ or oxyhydroxide of TM provided in step (a) has an average particle diameter (D50) in the range of from 3 to 20 μm, preferably from 5 to 16 μm. The average particle diameter can be determined, e. g., by light scattering or LASER diffraction or electroacoustic spectroscopy. The particles are usually composed of agglomerates from primary particles, and the above particle diameter refers to the secondary particle diameter.

Some elements are ubiquitous. In the context of the present invention, traces of ubiquitous metals such as sodium, calcium, iron or zinc, as impurities will not be taken into account in the description of the present invention. Traces in this context will mean amounts of 0.005 mol-% or less, referring to the total metal content of TM.

In one embodiment of the present invention, TM corresponds to general formula (I)

$$(Ni_aCo_bMn_c)_{1-d}M^1_d \quad (I)$$

with a being in the range of from 0.85 to 0.95, b being zero or in the range of from 0.01 to 0.14, c being in the range of from 0.01 to 0.15, and d being in the range of from zero to 0.05, $M^1$ is at least one of Al and Mg, and a+b+c=1.

$TM(OH)_2$ or oxyhydroxide of TM as provided in step (a) may contain traces of anions other than oxide and hydroxide, for example carbonate and sulfate. Especially when oxyhydroxide of TM is manufactured from sulfates of TM, some residual sulfate may remain in the precipitate. Carbonate may be included by the use of aged alkali hydroxide or by exposing the freshly precipitated $TM(OH)_2$ to air that contains $CO_2$.

$TM(OH)_2$ as provided in step (a) may be manufactured by co-precipitation of Ni and at least one of Co and Mn with alkali metal hydroxide from an aqueous solution of nickel sulfate that is combined with a sulfate of cobalt or manganese or with both and, if desired, at least one compound of metal(s) selected from Al, Ti, Zr, V, Co, Zn, or Ba, followed by filtration and drying.

Oxyhydroxide of TM as provided in step (a) may be manufactured by heating $TM(OH)_2$ and thus removing water, for example to temperature in the range of 80 to 200° C., under vacuum or under air. Oxyhydroxide of TM is meant to include non-stoichiometric oxyhydroxides, with water bound chemically as hydroxide or with residual moisture content by physically adsorbed water.

In step (b), $TM(OH)_2$ or oxyhydroxide of TM as provided in step (a) is dried at a temperature in the range of from 400 to 600° C., thereby obtaining an oxide or oxyhydroxide of TM with a residual moisture content of from 200 to 500 ppm, Especially when TM contains significant amounts of manganese, a partial oxidation of TM and specifically of the manganese takes place, and the oxide is not strictly stoichiometric TMO.

The residual moisture content may be determined, e.g., by Karl-Fischer Titration.

Step (b) may have a duration in the range of from 0.5 to 7 hours, preferably 1 to 2 hours.

In one embodiment of the present invention, step (b) is carried out in a roller hearth kiln, a pusher kiln or preferably in a plough-share mixer with heating system, and even more preferred in a rotary kiln, for example in a rotary kiln with inclination angle of from 0.5 to 3°. In rotary kilns, 0.5 to 2 revolutions per minute are preferred. On lab scale, step (b) may be carried out in a muffle oven as well.

In one embodiment of the present invention, step (b) is carried out under an atmosphere of air, synthetic air or nitrogen.

In one embodiment of the present invention, the oxide or oxyhydroxide of TM from step (b) has a specific surface (BET) in the range of from 50 to 120 $m^2/g$, determined by nitrogen adsorption after drying at 120° C. for 60 minutes, for example in accordance with to DIN-ISO 9277:2003-05.

In step (c), the oxide or oxyhydroxide of TM from step (b) is mixed with a source of lithium and with at least one compound of Mg or Al and with at least one compound of Ti or Zr.

In a preferred embodiment of step (c), the oxide or oxyhydroxide of TM from step (b) is mixed with a source of lithium and either with at least one compound of Al and with at least one compound of Zr, or with at least one compound of Mg and with at least one compound of Ti and, optionally, with at least one compound of Al.

Examples of sources of lithium are inorganic compounds of lithium, for example $LiNO_3$, $Li_2O$, LiOH, $Li_2O_2$, $Li_2CO_3$, and combinations of at least two of the foregoing, preference being given to $Li_2O$, LiOH and $Li_2CO_3$, water of crystallization being neglected in the context of the source of lithium, and even more preference being given to LiOH.

In one embodiment of the present invention, said source of lithium has an average particle diameter (D50) in the range of from 1 to 50 μm, preferably 20 to 30 μm.

Examples of compounds of Mg are magnesium nitrate, MgO, $MgCO_3$, $Mg(HCO_3)_2$ and $Mg(OH)_2$, preference being given to MgO and $Mg(OH)_2$, water of crystallization being neglected in the context of the source of magnesium. Even more preferred is $Mg(OH)_2$.

In one embodiment of the present invention, said compound of magnesium is particulate and has an average particle diameter (D50) in the range of from 50 nm to 1 μm, determined by dynamic light scattering.

Suitable compounds of aluminum are, e.g., $Al(NO_3)_3$, $Al_2O_3$, $Al(OH)_3$, AlOOH, $Al_2O_3\cdot aq$, preference being given to AlOOH and $Al_2O_3$, especially $\gamma$-$Al_2O_3$. Said source of aluminum may be added as aqueous solution, aqueous slurry or in particulate form, particulate form being preferred.

In one embodiment of the present invention, said compound of Al is particulate and has an average particle diameter (D50) in the range of from 0.5 nm to 10 μm, determined by dynamic light scattering.

Suitable compounds of Ti are $TiO(OH)_2$, $Ti(OH)_4$, $TiO_2$, $TiO_2\cdot aq$, preferred is $TiO_2$.

In one embodiment of the present invention, said compound of Ti is particulate and has an average particle diameter (D50) in the range of from 1 μm to 10 μm measured by laser diffraction.

Suitable compounds of Zr are $Li_2ZrO_3$, $ZrO(OH)_2$, $Zr(OH)_4$, $ZrO_2$, $ZrO_2\cdot aq$, preferred are $Zr(OH)_4$, $ZrO_2$, and $ZrO_2\cdot aq$, even more preferred is $Zr(OH)_4$.

In one embodiment of the present invention, said compound of Zr is particulate and has an average particle diameter (D50) in the range of 1 μm to 10 μm measured by laser diffraction.

In one embodiment of the present invention, the molar ratio of source of lithium to (TM+Ti+Zr+Al+Mg) added in step (c) is in the range of from 1.05:1 to 1.0:1.

In one embodiment of the present invention, the molar amount of Mg added in step (c) is in the range of from 0.05 to 2, preferred 0.05 to 1.2 mol-%, referring to TM. In other embodiments, as indicated above, no compound of Mg is added in step (c).

In one embodiment of the present invention, the molar amount of Al added in step (c) is in the range of from 0.1 to 3 mol-%, preferably 0.2 to 2 mol-%, referring to TM. In other embodiments, as indicated above, no compound of Al is added in step (c).

In one embodiment of the present invention, the molar amount of Ti added in step (c) is in the range of from 0.01 to 0.8 mol-%, preferred are 0.1 to 0.5 mol-%, referring to TM. In other embodiments, as indicated above, no compound of Ti is added in step (c).

In one embodiment of the present invention, the molar amount of Zr added in step (c) is in the range of from 0.01 to 0.8 mol-%, preferred are 0.2 to 0.6 mol %, referring to TM. In other embodiments, as indicated above, no compound of Zr is added in step (c).

Step (c) may be performed as one operation but is preferred that step (c) comprises the substeps of mixing $TM(OH)_2$ or TMO or oxyhydroxide of TM or combination with said source of lithium followed by a sub-step of addition of a solution of source of magnesium. Said substeps shall be described in more detail below. It is preferred, though, to perform step (c) in one step or to first mix source of lithium with compound of magnesium or aluminum and with compound of Ti or Zr, sub-step (c1), followed by combination of the resultant mixture with oxide or oxyhydroxide of TM, sub-step (c2). In other embodiments, oxide or oxyhydroxide of TM are mixed with source of lithium and with compound of magnesium or aluminum and with compound of Ti or Zr in a single step.

Examples of suitable apparatuses for performing step (c) are high-shear mixers, tumbler mixers, plough-share mixers, grinding mills and free fall mixers.

Step (c) may be performed at any temperature in the range of from zero to 100° C., ambient temperature being preferred.

In one embodiment of the present invention, step (c) has a duration of 10 minutes to 2 hours. Depending on whether additional mixing is performed in step (d) or not, thorough mixing has to be accomplished in step (c).

Although it is possible to add an organic solvent, for example glycerol or glycol, or water in step (c) it is preferred to perform step (c) in the dry state, that is without addition of water or of an organic solvent.

A mixture is obtained from step (c).

Step (d) includes subjecting said mixture to heat treatment, for example at a temperature in the range of from 550 to 875° C., preferably 650 to 850° C.

In one embodiment of the present invention, the mixture from step (c) is heated with a heating rate of 0.1 to 10° C./min.

In one embodiment of the present invention, the temperature is ramped up before reaching the desired temperature of from 550 to 875° C., preferably 650 to 850° C. For example, first the mixture from step (c) is heated to a temperature to 350 to 550° C. and then held constant for a time of 10 min to 4 hours, and then it is raised to 550° C. up to 875° C.

In embodiments wherein in step (c) at least one solvent has been used, as part of step (d), or separately and before commencing step (d), such solvent(s) are removed, for example by filtration, evaporation or distilling of such solvent(s). Preferred are evaporation and distillation.

In one embodiment of the present invention, step (d) is performed in a roller hearth kiln, a pusher kiln or a rotary kiln or a combination of at least two of the foregoing. Rotary kilns have the advantage of a very good homogenization of the material made therein. In roller hearth kilns and in pusher kilns, different reaction conditions with respect to different steps may be set quite easily. In lab scale trials, box-type and tubular furnaces and split tube furnaces are feasible as well.

In one embodiment of the present invention, step (d) is performed in an oxygen-containing atmosphere, for example in pure oxygen or in oxygen-enriched air, for example in a 1:3 to 1:10 by volume mixture of air and oxygen, preference being given to pure oxygen.

By performing the inventive process, a cathode active material is made that shows excellent stability such as a low capacity fade and a high cycling stability.

The inventive process may contain additional steps. Preferably, the inventive process comprises at least one of the steps (e) and (f), namely

- a step (e) of treating the material obtained from step (d) with an aqueous medium, preferably with water, followed by a liquid-solid separation step, and/or
- a step (f) of adding a compound of tungsten or preferably of boron to the material obtained from step (d) or (e), respectively, and a subsequent thermal treatment.

More preferably, the inventive process comprises both steps (e) and (f). Steps (e) and (f) are described in more detail below.

In said optional step (e), said cathode active material obtained from step (d) is treated with an aqueous medium, preferably with water. Said aqueous medium may have a pH value in the range of from 2 up to 14, preferably at least 3.5, more preferably from 5 to 7. The pH value is measured at the beginning of step (e). It is observed that in the course of step (e), the pH value raises to at least 10, for example 11 to 13. In embodiments wherein the pH value is in the range of from 10 to 11 at the beginning of step (e) it raises to more than 11 to up to 13. In embodiments wherein the pH value is in the range of 3 to below 10 at the beginning of step (e) it raises to 11 to up to 13 in the course of step (e).

It is preferred that the water hardness of said aqueous medium used in step (e) is at least partially removed, especially calcium. The use of desalinized water is preferred.

The pH value of said aqueous medium is influenced by substances dissolved or slurried in said aqueous medium, for example acidic compounds such as sulfuric acid or aluminum sulfate, or bases such as LiOH or NaOH. In a preferred embodiment, such aqueous medium is water.

In one embodiment of the present invention, step (e) is performed at a temperature in the range of from 5 to 85° C., preferred are 10 to 60° C.

In one embodiment of the present invention, step (e) is performed at normal pressure. It is preferred, though, to perform step (e) under elevated pressure, for example at 10 mbar to 10 bar above normal pressure, or with suction, for example 50 to 250 mbar below normal pressure, preferably 100 to 200 mbar below normal pressure.

Step (e) may be performed, for example, in a vessel that can be easily discharged, for example due to its location above a filter device. Such vessel may be charged with starting material followed by introduction of aqueous medium. In another embodiment, such vessel is charged with aqueous medium followed by introduction of starting material. In another embodiment, starting material and aqueous medium are introduced simultaneously.

In one embodiment of the present invention, in step (e), the amounts of water and electrode active material have a weight ratio in the range of from 1:5 to 5:1, preferably from 2:1 to 1:2.

Step (e) may be supported by mixing operations, for example shaking or in particular by stirring or shearing, see below.

In one embodiment of the present invention, step (e) has a duration in the range of from 1 minute to 90 minutes, preferably 1 minute to less than 60 minutes. A duration of 5 minutes or more is possible in embodiments wherein in step (e), water treatment and water removal are performed overlapping or simultaneously.

In one embodiment of the present invention, treatment according to step (e) and removal of the aqueous medium are performed consecutively.

After or during the treatment with an aqueous medium in accordance to step (e), water may be removed by any type of filtration, for example on a band filter or in a filter press.

In one embodiment of the present invention, at the latest 5 minutes after commencement of step (e), the removal of aqueous medium is started. Such removal includes partially removing the water from treated particulate electrode active material, for example by way of a solid-liquid separation, for example by decanting or preferably by filtration. Said "partial removal" may also be referred to as partially separating off.

In one embodiment of the present invention, the slurry obtained in step (e) is discharged directly into a centrifuge, for example a decanter centrifuge or a filter centrifuge, or on a filter device, for example a suction filter or in a filter press or in a belt filter that is located preferably directly below the vessel in which step (b) is performed. Then, filtration is commenced.

In a particularly preferred embodiment of the present invention, steps (e) and the removal of the aqueous medium are performed in a filter press or in a filter device with stirrer, for example a pressure filter with stirrer or a suction filter with stirrer (German for example: "Rührfilter-nutsche"). At most 5 minutes after, preferably at most 3 minutes after—or even immediately after—having combined starting material and aqueous medium in accordance with step (e), removal of aqueous medium is commenced by starting the filtration. On laboratory scale, treatment with and removal of the aqueous medium may be performed on a Büchner funnel be supported by manual stirring.

In a preferred embodiment, step (e) is performed in a filter device, for example a stirred filter device that allows stirring of the slurry in the filter or of the filter cake.

In one embodiment of the present invention, the aqueous medium or water removal in accordance to step (e) has a duration in the range of from 1 minute to 1 hour.

In one embodiment of the present invention, stirring in step (e) is performed with a rate in the range of from 1 to 50 revolutions per minute ("rpm"), preferred are 5 to 20 rpm. In other embodiments, it is 200 to 400 rpm.

In one embodiment of the present invention, filter media may be selected from ceramics, sintered glass, sintered metals, organic polymer films, non-wovens, and fabrics.

In one embodiment of the present invention, step (e) is carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform step (e) under an atmosphere with a carbon dioxide content below detection limit for example with infrared-light based optical methods.

From step (e), a solid residue is obtained, preferably in the form of a wet filter cake. The moisture content of the solid residue and especially of the filter cake may be in the range of from 3 to 20% by weight, preferably 4 to 9% by weight.

After step (e), drying may be performed, for example under nitrogen or under reduced pressure ("in vacuo") at 50 to 150° C., to obtain a free-flowing powder.

In step (f), a compound of tungsten or preferably of boron is added to the material obtained from step (d) or (e), respectively, and subsequently, a thermal treatment is performed.

Examples of compounds of tungsten are $WO_3$, $Li_2WO_4$, or $Li_4WO_5$.

Examples of compounds of boron are $B_2O_3$, boric acid ($B(OH)_3$) and lithium borates, for example $LiBO_2$. Boric acid is preferred. Said compound of boron may be added in bulk or in solution, for example as aqueous solution.

Combinations of compounds of tungsten and of boron are possible as well.

In a preferred embodiment, step (e) is performed as indicated above but with no drying, and a compound of boron is added to the moist or even wet filter cake.

In one embodiment of the present invention, the material obtained from step (d) or (e), respectively, are allowed to interact, for example in the range of from 10 minutes to 5 hours and at a temperature of from 5 to 85° C.

In one embodiment of the present invention, the amount of compound of tungsten or, preferably, of boron added in step (f) is in the range of from 0.05 to 1.5 mol-%, preferably 0.15 to mol-%, referring to TM.

Subsequently to the addition of compound of tungsten or boron a thermal treatment is performed. Said thermal treatment may be carried out in any type of oven, for example a roller hearth kiln, a pusher kiln, a rotary kiln, a pendulum kiln, or—for lab scale trials—in a muffle oven.

The temperature of said thermal treatment in step (f) may be in the range of from 150 to 600° C., preferably 250 to 500° C. and even more preferably from 250 to 400° C. Said temperature refers to the maximum temperature of step (f).

In one embodiment of the present invention, the temperature is ramped up before reaching the desired temperature of from 150 to 600° C. For example, first the mixture of step (f) is heated to a temperature to 350 to 550° C. and then held constant for a time of 10 min to 4 hours, and then it is raised to 500 to 600° C.

In one embodiment of the present invention, the heating rate in step (f) is in the range of from 0.1 to 10° C./min.

In one embodiment of the present invention, the heat treatment step (f) is performed in a roller hearth kiln, a pusher kiln or a rotary kiln or a combination of at least two of the foregoing. Rotary kilns have the advantage of a very good homogenization of the material made therein. In roller hearth kilns and in pusher kilns, different reaction conditions with respect to different steps may be set quite easily. In lab scale trials, box-type and tubular furnaces and split tube furnaces are feasible as well.

In one embodiment of the present invention, the heat treatment in step (f) is performed in an oxygen-containing atmosphere, for example in a nitrogen-air mixture, in a rare gas-oxygen mixture, in air, in oxygen or in oxygen-enriched air or in pure oxygen. In a preferred embodiment, the atmosphere in step (f) is selected from air, oxygen and oxygen-enriched air. Oxygen-enriched air may be, for example, a 50:50 by volume mix of air and oxygen. Other options are 1:2 by volume mixtures of air and oxygen, 1:3 by volume mixtures of air and oxygen, 2:1 by volume mixtures of air and oxygen, and 3:1 by volume mixtures of air and oxygen. Pure oxygen is even more preferred.

In one embodiment of the present invention, the heat treatment in step (f) has a duration in the range of from 30 minutes to 5 hours. Preferred are 60 minutes to 4 hours. The cooling time is neglected in this context.

A further aspect of the present invention relates to precursors, hereinafter also referred to as inventive precursors. The inventive precursors may be manufactured in accordance with steps (a) and (b) of the inventive process. Specifically, the inventive precursors are particulate oxides according to general formula $TMO_{1+y}$, wherein y is in the range of from zero to 0.1, TM corresponds to general formula (I), $$(Ni_aCo_bMn_c)_{1-d}M^1_d \quad (I)$$

with
a being in the range of from 0.85 to 0.95,
b being zero or in the range of from 0.01 to 0.14,
c being in the range of from 0.01 to 0.15, and
d being in the range of from zero to 0.05,
$M^1$ is at least one of Al and Mg, and
a+b+c=1.

Inventive precursors are preferably comprised of spherical particles, referring to particles that have a spherical shape. Spherical particles shall include not just those which are exactly spherical but also those particles in which the maximum and minimum diameter of at least 90% (number average) of a representative sample differ by not more than 10%.

In one embodiment of the present invention, inventive precursors are comprised of secondary particles that are agglomerates of primary particles. Preferably, inventive precursors are comprised of spherical secondary particles that are agglomerates of primary particles. Even more preferably, inventive precursors are comprised of spherical secondary particles that are agglomerates of spherical primary particles or platelets.

In one embodiment of the present invention, inventive precursors have an average particle diameter (D50) in the range of from 3 to 20 μm, preferably from 5 to 16 μm. The average particle diameter can be determined, e. g., by light scattering or LASER diffraction or electroacoustic spectroscopy. The particles are usually composed of agglomerates from primary particles, and the above particle diameter refers to the secondary particle diameter.

In one embodiment of the present invention, inventive precursors have a specific surface (BET) in the range of from 50 to 120 $m^2/g$, preferably 20 to 30 $m^2/g$, determined by nitrogen adsorption after drying at 120° C. for 60 minutes, for example in accordance with to DIN-ISO 9277:2003-05.

In one embodiment of the present invention, inventive precursors have a narrow particle diameter distribution, measured as their span. The span may be defined as ((D90)−D(10))/D(50), and the span being in the range of from 0.30 to 0.60, preferably of from 0.3 to 0.5.

In another embodiment of the present invention, inventive precursors have a broad particle diameter distribution, measured as their span. The span may be defined as ((D90)−D(10))/D(50), and the span being in the range of from 0.65 to 5.0, preferably of from 0.9 to 1.5.

Inventive precursors may have a monomodal or bimodal particle diameter distribution.

Inventive precursors may contain additional anions as impurities, for example sulfate in a molar percentage of 0.1 to 0.8 referring to oxide but being neglected in the context of the present invention.

A further aspect of the present invention refers to electrodes comprising at least one electrode active material according to the present invention. They are particularly useful for lithium ion batteries. Lithium ion batteries comprising at least one electrode according to the present invention exhibit a good discharge behavior. Electrodes comprising at least one electrode active material according to the present invention are hereinafter also referred to as inventive cathodes or cathodes according to the present invention.

A further aspect of the present invention relates to particulate electrode active materials, hereinafter also referred to as inventive electrode active materials or inventive cathode active materials. Inventive electrode active materials have a shell and a core, wherein the core comprises a composite lithium metal oxide according to the formula $Li_{1+x}TM'_{1-x}O_2$ and the shell comprises at least one compound of tungsten or preferably of boron, and wherein x is in the range of from −0.02 to +0.02, and wherein TM' corresponds to general formula (II)

$$\{(Ni_aCo_bMn_c)_{1-d}M^1_d\}_{1-e}M^2_e \quad (II)$$

with
a being in the range of from 0.85 to 0.95,
b being zero or in the range of from 0.01 to 0.14,
c being in the range of from 0.01 to 0.15, and
d being in the range of from zero to 0.05,
e being in the range of from 0.005 to 0.03,
$M^1$ is at least one of Al and Mg, and
$M^2$ is a combination of at least one of Al and Mg and at least one of Ti and Zr,
a+b+c=1.

In one embodiment of the present invention, inventive electrode active materials have an average particle diameter (D50) in the range of from 3 to 20 μm, preferably from 5 to 16 μm. The average particle diameter can be determined, e. g., by light scattering or LASER diffraction or electroacoustic spectroscopy. The particles are usually composed of agglomerates from primary particles, and the above particle diameter refers to the secondary particle diameter.

In one embodiment of the present invention, $M^2$
is either a combination of Al and Zr
or a combination of Mg and Ti and, optionally, with Al.

Inventive electrode active materials are preferably made by the inventive process.

The shell may have an average thickness in the range of from 1 nm to 500 nm. The shell may also be compared to a coating, which is preferably non-homogeneous and has an island structure.

The shell of inventive electrode active materials comprises a compound of tungsten or preferably of boron. Examples of compounds of tungsten are $WO_3$, $Li_2WO_4$, and $Li_4WO_5$. Examples of compounds of boron are $B_2O_3$, $LiBO_2$, $Li_2B_4O_7$, and combinations of at last two of the aforementioned.

In one embodiment of the present invention, inventive electrode active materials have a narrow particle diameter distribution, measured as their span. The span may be defined as ((D90)−D(10))/D(50), and the span being in the range of from 0.30 to 0.60, preferably of from 0.3 to 0.5.

In another embodiment of the present invention, inventive electrode active materials have a broad particle diameter distribution, measured as their span. The span may be defined as ((D90)−D(10))/D(50), and the span being in the range of from 0.65 to 5.0, preferably of from 0.9 to 1.5.

In one embodiment of the present invention, inventive electrode active materials have a specific surface (BET) in the range of from 0.1 to 2.0 $m^2/g$, determined by nitrogen adsorption after drying at 200° C. for 30 minutes, for example in accordance with to DIN-ISO 9277:2003-05.

Inventive cathode active materials may have a monomodal or bimodal particle diameter distribution.

Preferably, particles of inventive electrode active materials have a spherical shape. Spherical particles shall include not just those which are exactly spherical but also those particles in which the maximum and minimum diameter of at least 90% (number average) of a representative sample differ by not more than 10%.

In inventive cathode active materials, the composition of bigger particles may be the same as in smaller particles, or it may be different. For example, the nickel content may increase with increasing particle size and the Mn content accordingly then decreases, and the cobalt content being the same.

A further aspect of the present invention relates to cathodes, hereinafter also referred to as inventive cathodes. Inventive cathodes contain at least one inventive electrode active material.

Specifically, inventive cathodes contain (A) at least one inventive electrode active material, (B) carbon in electrically conductive form, (C) a binder material, also referred to as binders or binders (C), and, preferably, (D) a current collector.

In a preferred embodiment, inventive cathodes contain (A) 80 to 98% by weight inventive electrode active material, (B) 1 to 17% by weight of carbon, (C) 1 to 15% by weight of binder material, percentages referring to the sum of (A), (B) and (C).

Cathodes according to the present invention can comprise further components. They can comprise a current collector, such as, but not limited to, an aluminum foil. They can further comprise conductive carbon and a binder.

Cathodes according to the present invention contain carbon in electrically conductive modification, in brief also referred to as carbon (B). Carbon (B) can be selected from soot, active carbon, carbon nanotubes, graphene, and graphite, and from combinations of at least two of the foregoing.

Suitable binders (C) are preferably selected from organic (co)polymers. Suitable (co)polymers, i.e., homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol-% of copolymerized ethylene and up to 50 mol-% of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol-% of copolymerized propylene and up to 50 mol-% of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (C) is polybutadiene.

Other suitable binders (C) are selected from polyethylene oxide (PEO), cellulose, carboxymethylcellulose, polyimides and polyvinyl alcohol.

In one embodiment of the present invention, binder (C) is selected from those (co)polymers which have an average molecular weight $M_w$ in the range from 50,000 to 1,000,000 g/mol, preferably to 500,000 g/mol.

Binder (C) may be cross-linked or non-cross-linked (co) polymers.

In a particularly preferred embodiment of the present invention, binder (C) is selected from halogenated (co) polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to electrode active material. In other embodiments, inventive cathodes may comprise 0.1 up to less than 1% by weight of binder(s).

A further aspect of the present invention is a battery, containing at least one cathode comprising inventive electrode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol-% of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds according to the general formulae (III a) and (III b)

(IIIa)

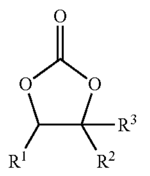

(IIIb)

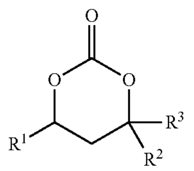

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

In yet another embodiment, in formula (III a) $R^1$ is fluorine and both $R^2$ and $R^3$ are hydrogen.

Another preferred cyclic organic carbonate is vinylene carbonate, formula (IV).

(IV)

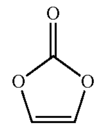

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur,
t=2, when Y is selected from among nitrogen and phosphorus, and
t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good discharge behavior, for example at low temperatures (zero ° C. or below, for example down to −10° C. or even less), a very good discharge and cycling behavior.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by the following working examples.

Average particle diameters (D50) were determined by dynamic light scattering ("DLS"). Percentages are % by weight unless specifically noted otherwise.

The specific surface (BET was in each case measured according to DIN-ISO 9277:2003-05. after drying the sample at 120° C. for 60 min under vacuum for precursors and at 200° C. for 30 minutes for cathode active materials.

I. Syntheses

I.1 Step (a.1) Precursor Co-Precipitation

A stirred tank reactor was filled with deionized water and 49 g of ammonium sulfate per kg of water. The solution was tempered to 55° C. and a pH value of 12 was adjusted by adding an aqueous sodium hydroxide solution.

The co-precipitation reaction was started by simultaneously feeding an aqueous transition metal sulfate solution and aqueous sodium hydroxide solution at a flow rate ratio of 1.8, and a total flow rate resulting in an average residence time of 8 hours. The transition metal solution contained Ni, Co and Mn at a molar ratio of 91:4.5:4.5 and a total transition metal concentration of 1.65 mol/kg. The aqueous sodium hydroxide solution was a 25 wt. % sodium hydroxide solution and 25 wt. % ammonia solution in a weight ratio of 6. The pH value was kept at 12 by the separate feed of an aqueous sodium hydroxide solution. Beginning with the start-up of all feeds, mother liquor was removed continuously. After 33 hours all feed flows were stopped. The mixed transition metal (TM) oxyhydroxide precursor TM-OH.1 was obtained by filtration of the resulting suspension), washing with distilled water, drying at 120° C. in air and sieving. The average particle diameter (D50) was 10 μm.

I.2 Step (b): Precursor Heat Treatment

Step (b.1): Precursor Drying 4 kg TM-OH.1 from step (a.1) was heated in a saggar in muffle furnace for 2 hours at 450° C. under flowing air. The material has a BET of 96.2 $m^2/g$.

I.3 Calcinations and Post-Treatments

I.3.1 Manufacture of CAM.1

Step (c.1): 2.7 kg dried precursor from step (b.1) was mixed with 1.27 kg LiOH monohydrate, 17 g $Mg(OH)_2$, 12 g $TiO_2$ and 11 g $ZrO_2$ for 15 minutes in a grinding mill or high shear mixer. A saggar was charged with the resultant mixture and transferred into a muffle furnace (step d.1). The temperature was raised at rate of 2 C/min to 750° C. under flowing oxygen and then held constant at 750° C. for 8 hours and subsequently allowed to naturally cool under flowing oxygen. The resultant powder was then deagglomerated in a grinding mill and sieved through a 325 mesh screen. After de-agglomeration, the powder had an average particle diameter (D50) of 11 μm.

Step (e.1): 400 g powder from step (d.1) was them added to 200 ml deionized water stirred for 2 minutes and then immediately filtered on a Buchner funnel to remove water. The wet filter cake was then dried under an $N_2$ atmosphere with reduced pressure at 120° C. for 10 hours.

Step (f.1): The resultant powder was then dry coated with boric acid by mixing 400 g powder, mixing media and 2.54 g boric acid for 40 minutes at low speed on a roller mill. A saggar was charged with the dried powder and heat treated in muffle furnace. The muffle furnace was heated to 300° C. for 2 hours under oxygen atmosphere and allowed to cool naturally. Inventive CAM.1 was obtained.

I.3.2 Manufacture of CAM.2

Step (c.2): 2.7 kg dried precursor from step (b.1) was mixed in grinding mill or high shear mixer with 1.27 kg LiOH monohydrate, 30 g $Al_2O_3$ and 11 g $ZrO_2$ for 15 minutes. A saggar was charged with the resultant mixture and transferred into a muffle furnace, step (d.2). The temperature was raised at rate of 2 C/min to 750° C. under flowing oxygen. The temperature was held constant at 750° C. for 8 hours and allowed to naturally cool under flowing oxygen. The resultant powder was then deagglomerated in a grinding mill and sieved through a 325 mesh screen. After de-agglomeration, the powder had an average particle diameter (D50) 11.2 μm.

Post Treatment

Step (e.2): 400 g powder from step (d.2) was them added to 200 ml deionized water stirred for 2 minutes and then immediately filtered on a Buchner funnel to remove water. The wet filter cake was then dried under an $N_2$ atmosphere with reduced pressure at 120° C. for 10 hours.

Step (f.2): The resultant powder was then dry coated with boric acid by mixing 400 g powder, mixing media and 2.54 g boric acid for 40 minutes at low speed on a roller mill. A saggar was charged with the dried powder and heat treated in muffle furnace. The muffle furnace was heated to 300° C. for 2 hours under oxygen atmosphere and allowed to cool naturally. Inventive CAM.2 was obtained.

CAM.1 had an average particle diameter (D50) of 10.8 μm and a specific surface (BET) of 0.65 $m^2/g$.

CAM.2 had an average particle diameter (D50) of 11.1 μm and a specific surface (BET) of 0.65 $m^2/g$.

II. Testing of Cathode Active Material

II.1 Electrode Manufacture, General Procedure

II.1.1 Cathode Manufacture

Positive electrode: PVDF binder (Solef® 5130) was dissolved in NMP (Merck) to produce a 7.5 wt. % solution. For electrode preparation, binder solution (3 wt. %), graphite (SFG6L, 2 wt. %), and carbon black (Super C65, 1 wt.-%) were suspended in NMP. After mixing using a planetary centrifugal mixer (ARE-250, Thinky Corp.; Japan), either inventive CAM.1 or CAM.2 (94 wt. %) was added and the suspension was mixed again to obtain a lump-free slurry. The solid content of the slurry was adjusted to 65%. The slurry was coated onto Al foil using a KTF-S roll-to-roll coater (Mathis AG). Prior to use, all electrodes were calendared. The thickness of cathode material was 70 μm, corresponding to 15 $mg/cm^2$. All electrodes were dried at 105° C. for 7 hours before battery assembly.

II.2: Electrolyte Manufacture

A base electrolyte composition was prepared containing 12.7 wt % of $LiPF_6$, 26.2 wt % of ethylene carbonate (EC), and 61.1 wt % of ethyl methyl carbonate (EMC) (EL base 1), based on the total weight of EL base 1. To this base electrolyte formulation 2 wt. % of vinylene carbonate (VC) was added (EL base 2).

II.3 Test Cell Manufacture—Coin-Type Half Cells

Coin-type half cells (20 mm in diameter and 3.2 mm in thickness) comprising a cathode prepared as described under II.1.1 and lithium metal as working and counter electrode, respectively, were assembled and sealed in an Ar-filled glove box. In addition, the cathode and anode and a separator were superposed in order of cathode//separator//Li foil to produce a half coin cell. Thereafter, 0.15 mL of the EL base 1 which is described above (III.2) were introduced into the coin cell.

III. Evaluation of Cell Performance

Evaluation of Coin Half-Cell Performance

The initial performance, C-rate performance and cycling performance were measured as follows: Coin half cells according to II.3 were tested in a voltage range between 4.3 V to 2.8 V at room temperature. For the initial cycles, the initial lithiation was conducted in the CC-CV mode, i.e., a constant current (CC) of 0.1 C was applied until reaching 4.3V, followed by the CV step until the current dropped to 0.01 C. After 10 min resting time, reductive lithiation was carried out at constant current of 0.1 C up to 2.8 V. For the C-rate test charge and discharge rates were adjusted accordingly. For the cycling test, the constant current was chosen to be 1 C until 100 cycles were reached. The results are summarized in Table 1.

Powder was formed into an electrode and tested in coin half cells. The electrochemical performance is summarized in Table 1:

TABLE 1

Electrochemical performance data of inventive cathode active materials

| | $1^{st}$ Discharge mAh/g | $1^{st}$ cycle efficiency | 0.1 C rate capacity mAh/g | 1 C rate capacity mAh/g | Capacity retention 100 cycles |
|---|---|---|---|---|---|
| CAM.1 | 212.0 | 89.0 | 214.9 | 193.4 | 79% |
| CAM.2 | 214.8 | 89.7 | 218.3 | 197.0 | 77% |

The invention claimed is:

1. A particulate electrode active material having a shell and a core, wherein the core comprises a composite lithium metal oxide according to a formula $Li_{1+x}TM'_{1-x}O_2$, and the shell comprises at least one compound of boron or tungsten, and wherein x is in a range of from −0.02 to +0.02, and wherein TM' corresponds to a formula (II)

$$\{(Ni_aCo_bMn_c)_{1-d}M^1_d\}_{1-e}M^2_e \quad (II)$$

with a being in a range of from 0.85 to 0.95, b being zero or in a range of from 0.01 to 0.14, c being in a range of from 0.01 to 0.15, and d being in a range of from zero to 0.05, e being in a range of from 0.005 to 0.03, $M^1$ is at least one of Al or Mg, and $M^2$ is a combination of at least one of Al or Mg and at least one of Ti or Zr, a+b+c=1.

2. A particulate electrode active material according to claim 1, wherein $M^2$ is either a combination of Al and Zr, or a combination of Mg and Ti and, optionally, Al.

3. A cathode containing:

(A) at least one electrode active material according to claim 1, (B) carbon in electrically conductive form, and (C) a binder material.

4. A cathode according to claim 3 containing:

(A) 80 to 98% by weight of the electrode active material, (B) 1 to 17% by weight of the carbon, and (C) 1 to 10% by weight of the binder material.

5. An electrochemical cell containing at least one cathode according to claim 3.

* * * * *